Figure 1:
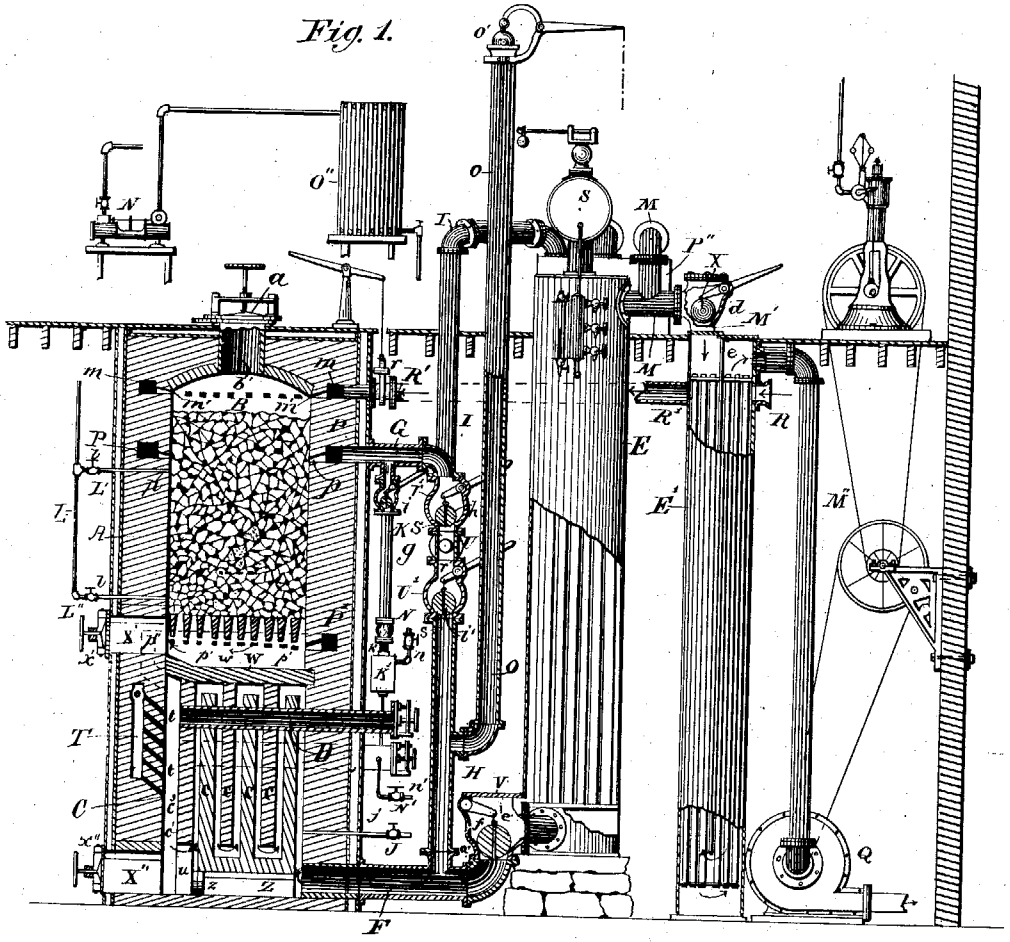

3 Sheets—Sheet 1.

B. LOOMIS.

PROCESS OF AND APPARATUS FOR THE MANUFACTURE OF GAS.

No. 11,036. Reissued Oct. 22, 1889.

Witnesses:
Arthur A. Erb.
H. A. Roberts.

Inventor:
Burdett Loomis
By his Atty
E. B. Clark

B. LOOMIS.

PROCESS OF AND APPARATUS FOR THE MANUFACTURE OF GAS.

No. 11,036. Reissued Oct. 22, 1889.

Witnesses:

Arthur A. Eck

W. A. Roberts.

Inventor.

Burdett Loomis

By his Atty

E. F. Clark

B. LOOMIS.

PROCESS OF AND APPARATUS FOR THE MANUFACTURE OF GAS.

No. 11,036. Reissued Oct. 22, 1889.

Witnesses:
Arthur A. Erb.
W. A. Roberts.

Inventor:
Burdett Loomis
By his Atty
E. B. Clark

UNITED STATES PATENT OFFICE.

BURDETT LOOMIS, OF HARTFORD, CONNECTICUT.

PROCESS OF AND APPARATUS FOR THE MANUFACTURE OF GAS.

SPECIFICATION forming part of Reissued Letters Patent No. 11,036, dated October 22, 1889.

Original No. 404,207, dated May 28, 1889. Application for reissue filed September 10, 1889. Serial No. 323,562.

*To all whom it may concern:*

Be it known that I, BURDETT LOOMIS, a citizen of the United States, residing at Hartford, in the county of Hartford and State of Connecticut, have invented certain new and useful Improvements in the Process of and Apparatus for the Manufacture of Gas; and I do hereby declare the following to be a full, clear, and exact description of the invention, such as will enable others skilled in the art to which it appertains to make and use the same.

This invention relates to the manufacture of illuminating and heating gas in cupola generating-furnaces in which a downdraft of air is used in the operation of heating up the fuel, the said air-draft in my present invention being drawn into and down through the fuel by an exhauster, instead of being forced in by a blower, as set forth in my patents, Nos. 338,990 and 338,992, dated May 30, 1886, whereby important advantages are gained in the ease and economy of working the generator—such as permitting the workmen to open the coal-feeding passages at the top and supply coal, or clean down the sides of the fuel-chamber with clinkering-bars, or inspect the condition of the fuel to determine its heat and to properly arrange and distribute it for giving the best effect, all while the exhauster is in operation and drawing air through the fuel without the danger and delay caused by flame and smoke being blown into the operator's face, as in the old way of operating. I also gain the important advantage of relieving the generator and body of fuel from the accumulation of air and gas therein under pressure and prevent the resulting undue combustion of the fresh bituminous coal at the top of the body of fuel and the formation of hard crusts before proper coking can take place, as results when blasts of air are forced down upon the top of the fuel. While I was able in practice to heat a body of fuel to incandescence by the air-blast forced down upon the surface of the fuel in accordance with my former patents, yet the air-blast would often cause much annoyance by accumulating under pressure and rolling or circulating around above the fuel, causing such active combustion that the fresh coal was melted and formed into hard cakes or crusts, which became so dense as to prevent the passage of air or gas, so that holes or channels were formed along the side walls and the air and steam escaped through them without proper reaction with the body of fuel, and of course without the proper production of gas. The operation of gas-making then had to be interrupted and the crusts broken up and the fuel arranged to close the channels along the walls. By drawing the air down and into the fuel and drawing the resulting gas down and out of the fuel I overcome the above difficulties and obtain much improved results in the better quality and increased yield of gas and also in ease of operating the generator. Inspection of the fuel and condition of the heat can also be conveniently made through sight holes or tubes without the annoyance of smoke, since the draft is inward when the stoppers of such tubes are removed. By means of the exhaust hot gaseous products drawn off from the generator air is heated in a tubular heater and then flows into the generator, so that part of the heat is restored. By means of my improved construction I provide for better keeping the ashes out of the superheating and fixing chamber and removing them from the cupola.

My cupola generator is made double—that is, with two fuel and decomposing chambers and two superheating and fixing or regenerating chambers in one shell so connected by pipes and valves that each set composed of a fuel-chamber and a superheating and fixing chamber can be operated separately, or the two sets can be operated together as one apparatus for manufacturing gas. The cupola is provided with suitable supply-pipes for air and steam, and with take-off pipes leading from the top and bottom, so that air or steam can be passed up or down through the fuel as its varying conditions require, and products of combustion or gas can be passed off either at top or bottom.

The matter constituting my invention herein will be defined in the claims.

The details of construction and operation will be fully described with reference to the accompanying drawings, in which—

Figure 2:
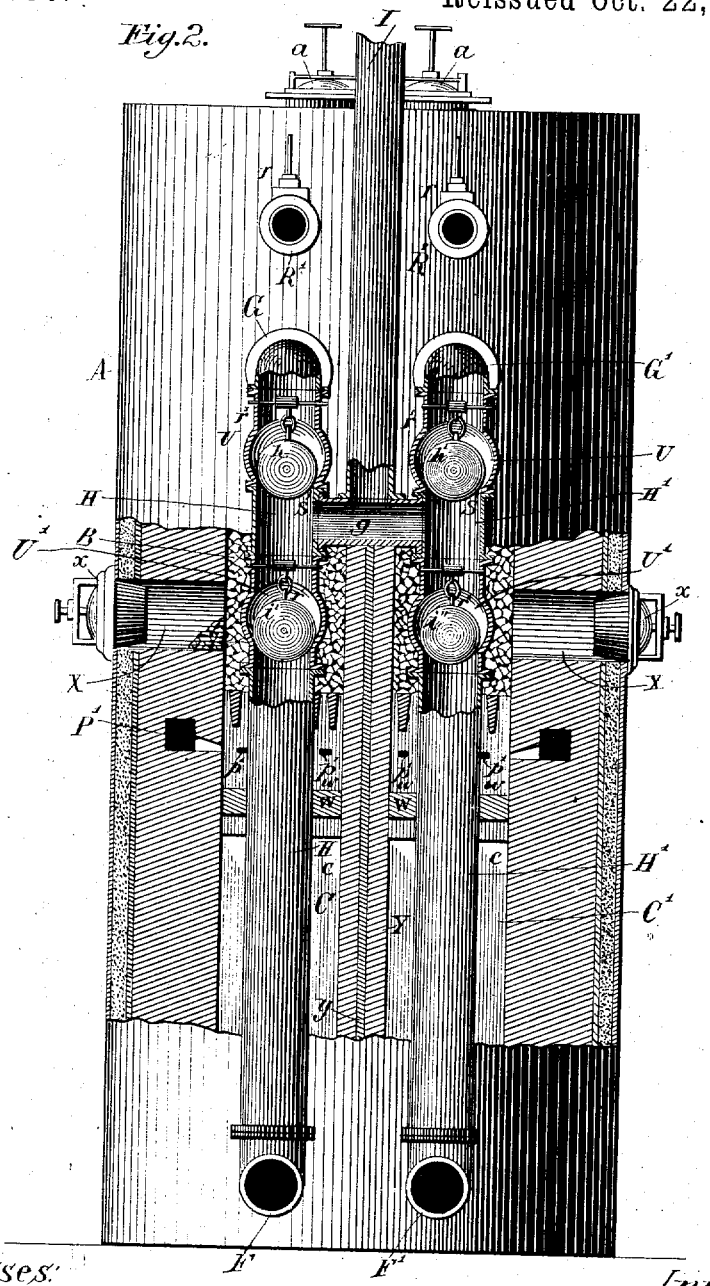
Figures 3, 4:
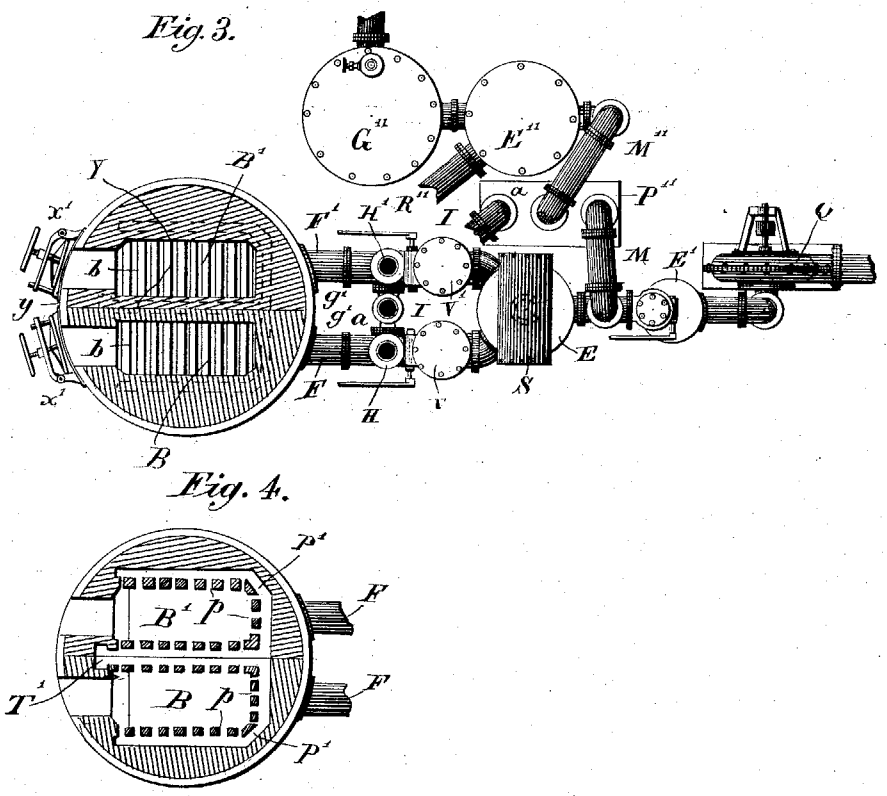

Figure 1 represents a vertical section from front to back through the cupola generator and the boiler and air-heater, partly in elevation and partly in section. Fig. 2 represents a rear view, on an enlarged scale, of the cupola and the valve boxes and pipes, partly in section. Fig. 3 represents a horizontal section through the cupola above the grates, and a top plan view of other portions of the apparatus. Fig. 4 represents a horizontal section through the ash-pits, gas-flues, and tuyeres of the cupola.

The cupola generator A is built of brick, with a lining of fire-brick and an inclosing iron jacket which is tightly riveted in the usual manner. A central vertical fire-brick partition Y, having incased within the brick the tight iron plate *y*, which is riveted to the outer iron jacket, divides the cupola from front to back, as shown in Fig. 3, and the horizontal brick partition W divides it across from front to rear, forming at the top the two fuel-chambers B B′ and at bottom the two superheating and fixing chambers C C′. The usual grates *b b* and ash-pits *w w* are provided. An opening X′ and door *x′* are provided for each ash-chamber for giving access to clean out the ashes. Side openings X X, having doors *x x*, are provided above the grates for convenience in kindling the fires, removing the clinker, &c. Annular flues P′ are formed in the walls of the ash-pits, and are provided with ports or tuyeres *p′*, opening into the ash-pits, and a short flue *p″* connects each flue P′ with the vertical flue $C^3$ below partition-floor W, whereby products of combustion or gas may be passed from the fuel-chamber into the superheating and fixing chamber, and superheated steam may be passed from the latter into the former. By the arrangement of flue P′ and tuyeres *p′*, as shown, the dust and ashes are better deposited in ash-pit *w* than would be the case if there were a direct connection from the ash-pit to chamber C, and it is quite important to prevent the accumulation of ashes in chamber C. Fuel-supply openings *b′ b′*, having tight-closing lids *a a*, are provided at the tops of chambers B B′.

The steam-superheating and gas-fixing chambers or regenerators C C′ are for convenience and efficiency arranged in the base or lower half of the cupola. The main fire-brick partition *c′* at one side forms flue $C^3$, connecting with flue P′ and chamber B, for the passage of superheated steam up into the fuel, or gas down into the fixing-chamber, and an opening *u* in the bottom of such partition leads from the flue into chamber C. In order to provide an effective and convenient heating-surface, chambers C C′ are provided with vertical fire-brick partitions or check-walls *c c*, extending alternately from top and bottom nearly the height of the chamber and at the proper distance apart to form vertical connecting passages or flues. The partitions resting upon the bottom over flue Z rise to within a distance of two to five inches from the top of the chamber, and the partition extending from the top projects to within a similar distance from the bottom of the chamber, thus providing passage-ways alternately at top and bottom and between the partitions. When laying up the partitions, the oil-vaporizing chambers or retorts D D′ are set in position, extending transversely through chambers C C′ and the contained partitions and opening into passage-ways $C^3$. Two or more retorts may be set in each chamber, and two, as shown, will usually be sufficient. Their outer projecting ends are closed with tight-fitting lids, and with such ends the oil-supply pipes N′, having valves *n′*, are connected. Pipes *k*, for supplying water-gas, also connect with the ends of the retorts through the medium of the gas and oil mixing chamber K′, having suitable mechanical mixing apparatus. (Not shown.) An oil-supply pipe N, having valve *n*, connects with chamber K′, and when oil is supplied by such pipe to the chamber the pipe N′ need not be used. A gas take-off pipe leads from each fuel-chamber and each superheating and fixing or regenerating chamber, so that gas or products of combustion can be passed off in either direction. Pipes F F′ connect the bases of chambers C C′ with the base of the vertical steam-boiler E, one pipe connecting on each side of the vertical partition of the boiler. The gas take-off pipes of the fuel-chambers are peculiarly arranged and connected, whereby important results are secured, as described below.

At a distance about one-third the height of each fuel-chamber, below its top, a circular horizontal flue P is provided in the brickwork, and is connected with the interior of the chamber by numerous short ports or tuyeres *p*, inclined downward, as shown, so that fuel will not lodge in them. In operating with bituminous coal for the manufacture of gas in a cupola furnace it has been found quite advantageous to conduct off the gases below the surface of the fuel, and the latter is therefore maintained at a height of from ten to twenty-five or thirty inches above the ports *p*. By this arrangement the condensable tarry vapors distilled from fresh charges of bituminous coal are compelled to pass down into the heated fuel below, and are thus converted into fixed gas. Another important advantage arising from this arrangement and method of operating is, that the coal is not baked at the top into a hard crust or arch, since the hot-water gas rising from the incandescent fuel below does not pass through the fresh charges, and the latter are therefore distilled at a more moderate heat, so as to produce good coke. Where the hot-water gas has been passed off directly through the fresh fuel the heat was so high as to melt the coal and cause it to run together into coherent cakes, which retarded the flow of gas and passage of air and otherwise interfered with the operation of the generator. By my present improvements I overcome these difficulties and secure much better results. Gas-eduction pipes G G′ lead from flues P at the rear of the cupola and connect with the vertical pipes H H′, which connect below with pipes F F′, as shown in Figs. 1, 2, and 3. A short pipe *g* connects pipes H H′ for conducting gas from one fuel-chamber to the other when the valves are properly adjusted, and a pipe I, connecting with pipe *g*, leads to the hydraulic seal-box P″ for conducting gas off direct from either chamber of the cupola when it is not desired to pass it through the boiler E. Pipes O, having ball-valves *o′* at the top, connect with pipes H H′ below valve-boxes U U′ for the escape of products of combustion when the exhauster is not in operation, or when it is not desired to pass the products through the boiler.

Valve-boxes U U′ are connected in pipes H H′ above and below cross-pipe *g*, and are provided with upper seats *r′* and lower seats *s* to accommodate the ball-valves *h h′* and *i′ i″*. Each ball-valve is suitably hung upon a lever-arm attached to a rock-shaft, which passes through the casing and is provided externally with an operating-handle, so that the valves can be raised or lowered upon either seat, as desired. Similar valve-boxes V V′, having openings closed by lids *v*, are bolted to the pipes F F′, and are provided with seats *a′ e′* and with ball-valves *f f′*, hung and operated like those above described.

A pipe K, having valve *i*, leads from each of the pipes G G′, and connects by means of branch pipes *k* with gas and oil mixing chambers K′, which connect with retorts D D′ for supplying them with mixed hot-water gas and oil-vapor. Steam-supply pipes J J′, having valves *j j′*, connect with the bases of chambers C C′. Pipes L supply steam direct to the fuel-chamber, one branch L′ having valve *l* connecting near flue P, and one branch L″ having valve *l′* connecting with the lower part of the chamber above the grate.

Air-supply pipes connect with the tops of the fuel-chambers and with the superheating and fixing or regenerating chambers through the medium of chamber T and vertical flue C³. The air-supply pipe R′, provided with valves *r*, leads from the tubular air-heater E′ and connects with the annular flue *m*, built in the brick walls at the top of each fuel-chamber B B′, and numerous tuyeres *m′* open from the flue to the fuel-chamber. A pipe R″, Fig. 3, leads from the gas-cooler and air-heater E″, and may connect by pipes (not shown) with chamber T in the front wall of chambers C C′. Numerous small ports *t*, inclined downward, open from chamber T into vertical flue C³, so that numerous fine streams of air may be mingled with and cause complete combustion of hot gaseous products passed down from the fuel through flue P′ at the time of heating up the chambers. The tubular heater E′ acts as a cooler for products of combustion after passing through the boiler. It is provided with the usual smoke-boxes at the ends and with a vertical partition *e* extending from its top to near the lower ends of the tubes, and with an inlet R for air just below the upper tube-plate, so that air will circulate down around the tubes on one side of the partition and up on the other side to pipe R′, while hot gaseous products pass through the tubes and finally off through pipe M″ to the exhauster Q, by which they are drawn off and delivered to the stack or a holder or a furnace for immediate use. The exhaustion of gaseous products from the generator draws the air through the heater and into the fuel-chamber. An outlet-pipe M leads from the top of the boiler E into the hydraulic seal-box P″, and a branch M′, having ball-valve *d*, connects with the top of cylinder E′. When valve *d* is open, products of combustion or gas escape into heater E′, but when it is closed gas passes through pipe M into the seal-box. Since the end of pipe M is sealed by liquid in the box, the resistance is sufficient to prevent the flow of products of combustion in that direction when valve *d* is open, and also to prevent the escape of gas by back-pressure; but when valve *d* is closed gas passes from pipe M through the liquid seal in the usual manner. A steam dome or drum S is connected with the top of the boiler. An oil-pump N″ and elevated tank O″ supply oil to the vaporizing-retorts D. A flue Z, having a stopper *z*, is arranged at the base of chamber C for giving access to pipe F for cleaning it when desired.

In order to make illuminating-gas, all the chambers of the cupola are preferably operated together, as follows: The lids being removed, fires are kindled on the grates, and at first allowed to burn by natural draft. Coal or coke is gradually fed in till deep beds of fuel are formed and well ignited. Then all the lids and doors of the cupola are closed, valves *f f′* raised upon seats *e′*, valves *h h′* dropped upon seats *s*, and valve *d* opened. The exhauster Q is now started and draws gaseous products down through the fuel into chambers C C′, and causes air to flow into the top of the fuel-chambers through flue *m* and tuyeres *m′*, and into flue C³ through chamber and ducts T *t*. The air-draft passes down into the fuel and the resulting producer-gas passes through ports *p′* and flues P′ and *p″* into flue C³, from which it may be drawn off by the exhauster and stored or used directly in a heating-furnace; or such producer-gas as it flows into flue C³ may be ignited by air from chamber T and complete combustion caused in chambers C C′, resulting in highly heating the contained fire-clay partitions, and the products then pass out through the boiler and air-heater, in which they are cooled by the air circulating around the tubes, and finally pass through the exhauster to the stack. (Not shown.)

The air-drafts are continued till beds of fuel of sufficient depth are heated to incandescence and chambers C C′ are heated to the proper temperature for superheating steam and converting hydrocarbon vapor into fixed gas, after which such drafts are shut off and the exhauster may be stopped, valve $d$ is closed, valves $h$ $h'$ are suspended between the upper and lower seats, thus providing open passages to cross-pipe $g$, while valves $i'$ are closed down. Valve $f$ is closed down upon seat $a'$, and valve $f'$ is opened, providing an open passage from chamber C′ and pipe F′ to the boiler and seal-box. Steam is now admitted through pipe J into the base of chamber C, through which it passes and becomes highly superheated, and then passes by way of flue P′ and tuyeres $p'$ up into the incandescent fuel in chamber B, where it is decomposed, forming water-gas, which passes by ports $p$ below the surface of the fuel into flue P, and thence by pipes G, $g$, and G′, the second flue P, and ports $p$ into fuel-chamber B′, some distance below the surface of the fuel. In passing down through the fuel in this second chamber carbonic acid which may be present in the gas is converted into carbonic oxide, and hydrocarbon vapors given off from the fresh charges of bituminous coal are converted into fixed gas. By this method of operating bituminous coal in the form of lump or slack or dust can be successfully fed onto the fuel above ports $p$ and there distilled, since the hot-water gas does not pass through and melt it, and the hydrocarbon vapors evolved pass into the hot fuel below and are converted into fixed gas. Good coke is thus produced, which descends into the chambers as the ash is removed below.

By the use of bituminous coal much carbureted-hydrogen or marsh gas is produced, which is a valuable addition to the water-gas. The mixture of water-gas and carbureted hydrogen passes from chamber B′ through ports $p'$ and flues P′ and $p''$ into chamber C′, where it is carbureted and fixed. As gas passes from chamber B through pipe G, valve $i$ in pipe K is opened and a regulated portion of the gas is passed by pipe K and branches $k$ into the gas and oil mixing chamber K′, into which hydrocarbon oil is also admitted and mechanically mixed with the gas, and the carbureted gas is passed into retorts D, where, under a moderate heat, the oil vapor or gas is thoroughly diffused in the water-gas and carried thereby into flue C$^s$, where it meets and carburets the gas passing down from the fuel. The carbureted gas passes through fixing-chamber C′, where it is combined and converted into a fixed gas, which passes through the boiler and pipe M to the seal-box, from which it is conducted by pipe M″ to cooler E″, from which it enters scrubber G″.

The gas-cooler E″ is made tubular, like chamber E′, and acts as a heater for air which is passed through it. At the time gas is passed through the second fuel-chamber B′ a limited supply of steam may be admitted by pipe L′ into the chamber and decomposed. This will be advantageous when the fuel is at a very high heat. The manufacture of gas is continued, as above described, so long as the fuel and the fixing-chambers remain at the proper decomposing and converting temperature; but when they become too much cooled the steam and oil are shut off, the valves for the escape of products of combustion are adjusted, as before described, and the air-drafts again admitted by starting the exhauster till the bodies of fuel and chambers C C′ are again properly heated. During the second gas-making run the direction of gas and steam through the chambers may be reversed—that is, the steam may be admitted to and superheated in chamber C′ and the gas be carbureted and fixed in chamber C and discharged from its base through pipe F. Thus at each successive run the direction of the currents may be reversed; or, if desired, the direction of the currents may be reversed during the run. By this method of operating, carbon which may be deposited in the fixing-chambers during one run or period is taken up by the steam during a subsequent run or period, and the chambers thus kept clean. Both sets of chambers may be operated in this way at the same time.

Should it be desired to make illuminating-gas by the use of a separate set of chambers, they are first heated. Then valve $f$ is raised against seat $e'$, while valves $d$ and $h$ are closed down, and steam is admitted into the upper portion of the fuel through pipe L′, is decomposed by passage downward, and the resulting gas is carbureted and fixed in chamber C and conducted off through pipe F and the boiler to the seal-box; or valve $f$ may be closed down and valve $i'$ opened and the gas passed up through pipes F, H, $g$, and I. In this latter way one set of chambers, as B C, may be used for making illuminating-gas, while the other set, as B′ C′, is being heated up by drafts of air; or both sets may be simultaneously heated and independently used for making gas.

When the water-gas for heating purposes is desired as the final product of the generator, and the body of fuel has been heated to incandescence and the superheating-chamber C properly heated, then valve $h$ is raised from its seat $s$, so as to open a passage from the fuel-chamber through pipes G, $g$, and I to the seal-box. Valves $f$ and $i$ are closed down upon their lower seats and steam is admitted by pipe J into superheating-chamber C, where it is superheated and then flows up into the body of incandescent fuel in chamber B, where it is decomposed. The resulting water-gas, together with gas distilled from the top layers of bituminous coal, escapes by flue P and pipes G, $g$, and I to the seal-box. Both sets of chambers may be operated in this way to produce water-gas for heating purposes. No oil is used in this operation for carbureting the water-gas; but a small amount of carbureted hydrogen is generated from the top layers of fresh coal and mixes with the water-gas in sufficient quantity to give it the desired odor and increase its heating-power. When it is desired to generate producer-gas and utilize it for heating purposes outside of the generator, the air is admitted to the top of the body of fuel and by operation of the exhauster is drawn down into it, causing combustion and the production of carbonic oxide. Oily and tarry vapors distilled from the fresh layers of bituminous coal are also drawn down into the heated fuel below and converted into fixed carbureted-hydrogen gas. My producer-gas, composed of carbonic oxide and carbureted hydrogen, is drawn down into chamber C, where it imparts its heat to the brick-work, but is not burned, since the air-supply to chamber T is closed, and is thence drawn through the tubular boiler E, where it is cooled by the circulating water, thence through the tubular air-heater E″, where it is further cooled by the circulating air, and is finally discharged from the exhauster into a holder or into a furnace for immediate use. It is advantageous to cool the gas by passage through a tubular water or air chamber before it reaches the exhauster, in order that the latter may not be injured by undue heat.

By means of the downward air-drafts ashes are blown or drawn down through the grate into the ash-pit, and the fuel is kept clean and left porous, so that it will better decompose steam. An additional advantage of a downdraft drawn by an exhauster through the fuel is that the generator is thereby made coolest at the top, and consequently can be easily supplied with coal, cleaned of clinker, the fuel inspected and arranged to the best advantage without delay and annoyance caused by smoke and flame, which usually interfere with the operator and prevent the proper management of the fire. The vaporizing-retorts passed through the fixing-chambers afford increased carbureting-surface and prevent the too sudden exposure of the oil-vapor to the highly-heated brick, whereby waste by burning is prevented. The ball-valves afford great convenience and facility in operating the apparatus.

Having thus described my invention, what I claim, and desire to secure by Letters Patent, is—

1. The process of manufacturing gas which consists in heating a body of fuel to incandescence by drafts of air drawn downward into the fuel and by drawing off the gaseous products by an exhauster, whereby the fuel may be better fed, inspected, and arranged in the generator during the operation of heating up, then shutting off the air-draft and decomposing steam in contact with the fuel, thereby producing water-gas.

2. The process of manufacturing gas which consists in heating a body of fuel to incandescence by downward drafts of air, and by means of the resulting gaseous products heating a superheating-chamber and drawing off the products by an exhauster, whereby the furnace may be charged and cleaned during the operation of the exhauster, then shutting off the air-drafts and superheating steam by passage through the superheating-chamber and decomposing it by passage through the incandescent fuel, thereby producing water-gas.

3. The process of producing fixed combustible gas which consists in forming a bed of incandescent fuel in a generating-chamber, supplying fresh fuel at suitable intervals to the top of said bed of fuel, admitting atmospheric air to the generating-chamber above the fuel and drawing or exhausting it downward into said fuel, drawing or exhausting the oily and tarry vapors and products of combustion down into and through the incandescent fuel, and drawing or exhausting the resulting fixed gaseous products out of the generating-chamber at or near its bottom, as described.

4. In combination with a gas-generating cupola or furnace, an air-supply pipe or opening connecting with the top above the fuel, means for controlling the supply of air through such pipe or opening, and an outlet for gaseous products leading from the bottom, and an exhauster connecting with such outlet-pipe for drawing off gaseous products from the bottom of the generator, as described.

5. In combination with the gas-generating furnace, a tubular air-heater and gas-cooler having an air-inlet and pipe connecting it with the top of the generator, an exhaust-pipe for gaseous products leading from the bottom of the generator and connecting with the tubes of the heater, and a connected exhauster for drawing off the gaseous products through the tubes and drawing air through the chamber around the tubes and down into the fuel, whereby the gas is cooled by the circulating air and the latter is heated as it flows to the generator.

6. In a cupola gas-generating furnace, the fuel-chamber arranged above and the superheating and fixing chamber below, in combination with the valved take-off pipe F, leading from the superheating-chamber, outlet-pipe G, leading from the fuel-chamber, valved pipe H, connecting pipe G with pipe F, and escape-pipe O, having a closing cap or valve leading from pipe H, for the purpose described.

7. In a cupola gas-generating furnace, the two fuel-chambers and the two superheating and fixing chambers, in combination with valved pipes F F′, pipes G G′, connecting-pipes H H′, having valves *h h′*, cross-pipe *g*, connecting the pipes H H′ between the valves, and pipe I, leading from pipe *g* to the seal-box, as and for the purpose described.

In testimony whereof I affix my signature in the presence of two witnesses.

BURDETT LOOMIS.

Witnesses:
J. L. RATHBONE,
R. J. CUSTER.